(12) United States Patent
Delaporte

(10) Patent No.: US 11,860,697 B2
(45) Date of Patent: Jan. 2, 2024

(54) PERIPHERAL ENCLOSURE MECHANISM FOR A FLEXIBLE DISPLAY DEVICE

(71) Applicant: Lepton Computing LLC, Brooklyn, NY (US)

(72) Inventor: Stephen E. Delaporte, New York, NY (US)

(73) Assignee: LEPTON COMPUTING LLC, Brooklyn, NY (US)

( * ) Notice: Subject to any disclaimer, the term of this patent is extended or adjusted under 35 U.S.C. 154(b) by 0 days.

(21) Appl. No.: 18/106,186

(22) Filed: Feb. 6, 2023

(65) Prior Publication Data

US 2023/0195178 A1    Jun. 22, 2023

Related U.S. Application Data

(63) Continuation of application No. 17/214,623, filed on Mar. 26, 2021, now Pat. No. 11,599,158.

(60) Provisional application No. 63/001,227, filed on Mar. 27, 2020.

(51) Int. Cl.
G06F 1/16    (2006.01)

(52) U.S. Cl.
CPC .......... G06F 1/1681 (2013.01); G06F 1/1616 (2013.01); G06F 1/1647 (2013.01); G06F 1/1652 (2013.01)

(58) Field of Classification Search
CPC combination set(s) only.
See application file for complete search history.

(56) References Cited

U.S. PATENT DOCUMENTS

| 8,355,755 | B2 * | 1/2013 | Kim | H04M 1/022 |
| | | | | 455/425 |
| 9,173,288 | B1 * | 10/2015 | Kim | G06F 1/1681 |
| 9,204,565 | B1 * | 12/2015 | Lee | E05F 1/1016 |

(Continued)

FOREIGN PATENT DOCUMENTS

WO    2021195579 A1    9/2021

OTHER PUBLICATIONS

International Preliminary Report on Patentability in Application No. PCT/US2021/024505 dated Sep. 22, 2022, 7 pages.

(Continued)

*Primary Examiner* — Lisa Lea-Edmonds
(74) *Attorney, Agent, or Firm* — Burns & Levinson, LLP; Joseph M. Maraia

(57) ABSTRACT

A foldable touch screen display device with a flexible display made up of segments that can be folded from a compact state to an expanded state which also includes a peripheral enclosure mechanism. The peripheral enclosure mechanism can be automatically repositioned to rotate out of a channel as the device is being folded in such a way that it can close the gap at the sides of the device between two flexible display segments when the device is fully configured to a folded state. The device may further include sensors to indicate the state of configuration and mechanisms for alignment, locking, and further structural support. In one embodiment, a module attached to, situated within, or otherwise associated with at least one segment of the flexible display or rigid display may contain all or substantially all processing and memory, along with a communications system, which may be used in any state.

12 Claims, 3 Drawing Sheets

(56) References Cited

U.S. PATENT DOCUMENTS

| | | |
|---|---|---|
| 9,348,450 B1 | 5/2016 | Kim |
| 10,054,990 B1* | 8/2018 | Harmon ................ G06F 1/1681 |
| 10,248,224 B2 | 4/2019 | Klein et al. |
| 10,545,541 B1* | 1/2020 | Dighde ................. F16M 11/06 |
| 10,768,667 B2 | 9/2020 | Lin et al. |
| 11,366,498 B2* | 6/2022 | Shibayama ........... G06F 1/1616 |
| 11,599,158 B2* | 3/2023 | Delaporte ............. G06F 1/1681 |
| 2009/0131117 A1 | 5/2009 | Choi |
| 2013/0021762 A1 | 1/2013 | Van Dijk et al. |
| 2017/0139663 A1* | 5/2017 | Ahn ..................... G09G 3/2092 |
| 2018/0335679 A1 | 11/2018 | Hashimoto et al. |
| 2021/0303035 A1* | 9/2021 | Delaporte ............. G06F 1/1681 |
| 2022/0272185 A1* | 8/2022 | Ju ...................... H04M 1/0216 |
| 2022/0303371 A1* | 9/2022 | Liao .................... H04M 1/0268 |
| 2023/0019784 A1* | 1/2023 | Hirakata ........... G02F 1/133308 |

OTHER PUBLICATIONS

International Search Report and Written Opinion in Application No. PCT/US2021/024505 dated Jun. 24, 2021, 8 pages.

* cited by examiner

PERIPHERAL ENCLOSURE MECHANISM FOR A FLEXIBLE DISPLAY DEVICE

REFERENCE TO RELATED APPLICATIONS

This application is a continuation of U.S. patent application Ser. No. 17/214,623, which claims priority to and the benefit of U.S. patent application No. 63/001,227, filed Mar. 27, 2020 and titled "PERIPHERAL ENCLOSURE MECHANISM FOR A FLEXIBLE DISPLAY DEVICE," The entire contents of the above-referenced applications are incorporated herein by reference in its entirety.

Field of the Invention

The present invention relates generally to computing devices, and more particularly, to a computing device with a touch screen display that can be folded from a compact state to an expanded state

Background of the Invention

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic-intensive applications, and reading text. The rigid nature of a standard touch screen display can also limit the portability of a device when its form factor is in the larger size range for a phone, or at the scale of a tablet, which makes folding a desirable feature. Additionally, because a radius is required along the folding axis of a flexible display when it is in a folded state, a wedge-shaped folded configuration is typically required for the display to retain its functionality. However, this can leave a gap along the side of the device where dirt and debris can access the display when the device is configured in its folded state, which can potentially cause damage to the display.

There is therefore a need for touch screen display devices that can be adjusted in size without sacrificing the convenience of being small and handheld. There is also a need for a peripheral enclosure at the sides of a foldable device that can close the gap between each flexible display segment without comprising the functionality of the display or increasing the thickness of the device and limiting the available space inside for components.

Summary of Embodiments of the Invention

A foldable touch screen display device with a flexible display made up of segments that can be folded from a compact state to an expanded state which also includes a peripheral enclosure mechanism. The form factor of the compact state is roughly the size of a typical handheld phone or smaller. The form factor of the expanded state is roughly the size of a larger phone or tablet computer, which may also include the mechanical functionality of a laptop. Both states ay include an integrated speaker and microphone. The peripheral enclosure mechanism can be automatically repositioned to rotate out of a channel as the device is being folded in such a way that it can close the gap between two flexible display segments when the device is fully configured to a folded state. The device may further include sensors to indicate the state of configuration and mechanisms for alignment, locking, and further structural support. In one embodiment, a module attached to, situated within, or otherwise associated with at least one segment of the flexible display or rigid display may contain all or substantially all processing and memory, along with a communications system, which may be used in any state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information nontransitory storage medium that may store instructions to perform in operations and/or processes. Although embodiments of the invention are not limited in this regard, the terms "plurality" and "a plurality" as used herein may include, for example, "multiple" or "two or r yore". The terms "plurality" or "a plurality" relay be used throughout the specification to describe two or more components, devices, elements, units, parameters, or the like. Unless explicitly stated, the method embodiments described herein re not constrained to a particular order or sequence. Additionally, some of the described method embodiments or elements thereof can occur or be performed simultaneously, at the same point in time, or concurrently.

Figure 1:
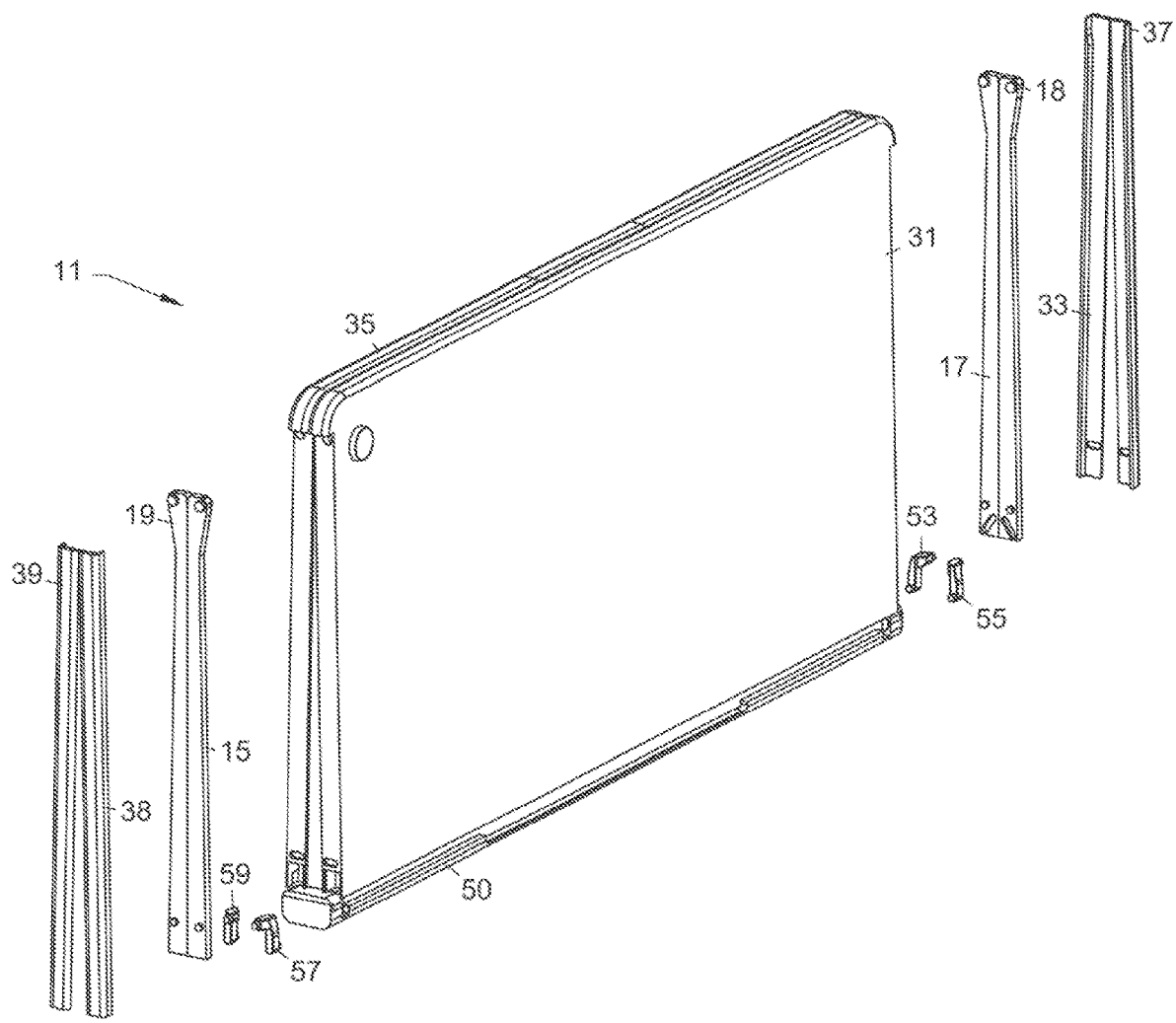
FIG. 1 is an exploded perspective view of a foldable computing device in a folded state with its peripheral enclosure panels and drive mechanism shown exploded outward at the sides of the device.

In accordance with the exemplary embodiment shown in FIG. 1, a foldable computing device 11 is illustrated in a folded, compact state with a first flexible display segment structure 35 and a second flexible display segment structure 31 folded against each other through hinge 50, which is situated between both segment structures. Peripheral enclosure panels 19 and 15 are shown exploded outward from the sides of the device with their respective panel drive links 59 and 57 shown at the base of the device. Panel drive links 59 and 57 rotate within respective holes situated inside of hinge 50 so that they can pivot to drive peripheral enclosure panels 19 and 15 and their integrated slot to retract within channels created by segment structures 35 and 31 and their attached housing shells 39 and 38 as the device in unfolded to an open, expanded state. These same panel drive links 59 and 57 also push their respective peripheral enclosure panels 19 and 15 partially out of segment structures 35 and 31 and their attached housing shells 39 and 38 as the device is configured to a closed state. It is important to note that a slot is also included along the internal side of each of the peripheral enclosure panels 19 and 15, which engages with a pin situated at the top end of each of the panel drive links 59 and 57. As the device is folded, the pin at the top of each of the peripheral enclosure panels 19 and 15 forces each of the peripheral enclosure panels 19 and 15 to move inward and outward from segment structures 35 and 31 and their attached housing shells 39 and 38. A pivot point at the top of each of the peripheral enclosure panels 19 and 15 allows the panels to deploy from segment structures 35 and 31 and their attached housing shells 39 and 38 on an angle to cover the same angle geometry of the gap that sits between segment structures 35 and 31 when the device is in a folded state. This mechanism used for guiding the motion of peripheral enclosure panels 19 and 15 can be seen with greater detail in FIG. 2. A second set of peripheral enclosure panels 17 and 18 also sit on the opposite side of the device to close the gap that is situated between flexible display segments structures 35 and 31 as the device is configured to a folded state. Just as panel drive links 59 and 57 force peripheral enclosure panels 19 and 15 to deploy and retract segment structures 35 and 31 and their attached housing shells 39 and 38 as the device is unfolded and folded, a second set of panel drive links 53 and 55 force peripheral enclosure panels 17 and 18 to deploy and retract from segment structures 35 and 31 and their attached housing shells 33 and 37 as the device is unfolded and folded.

Figure 2:
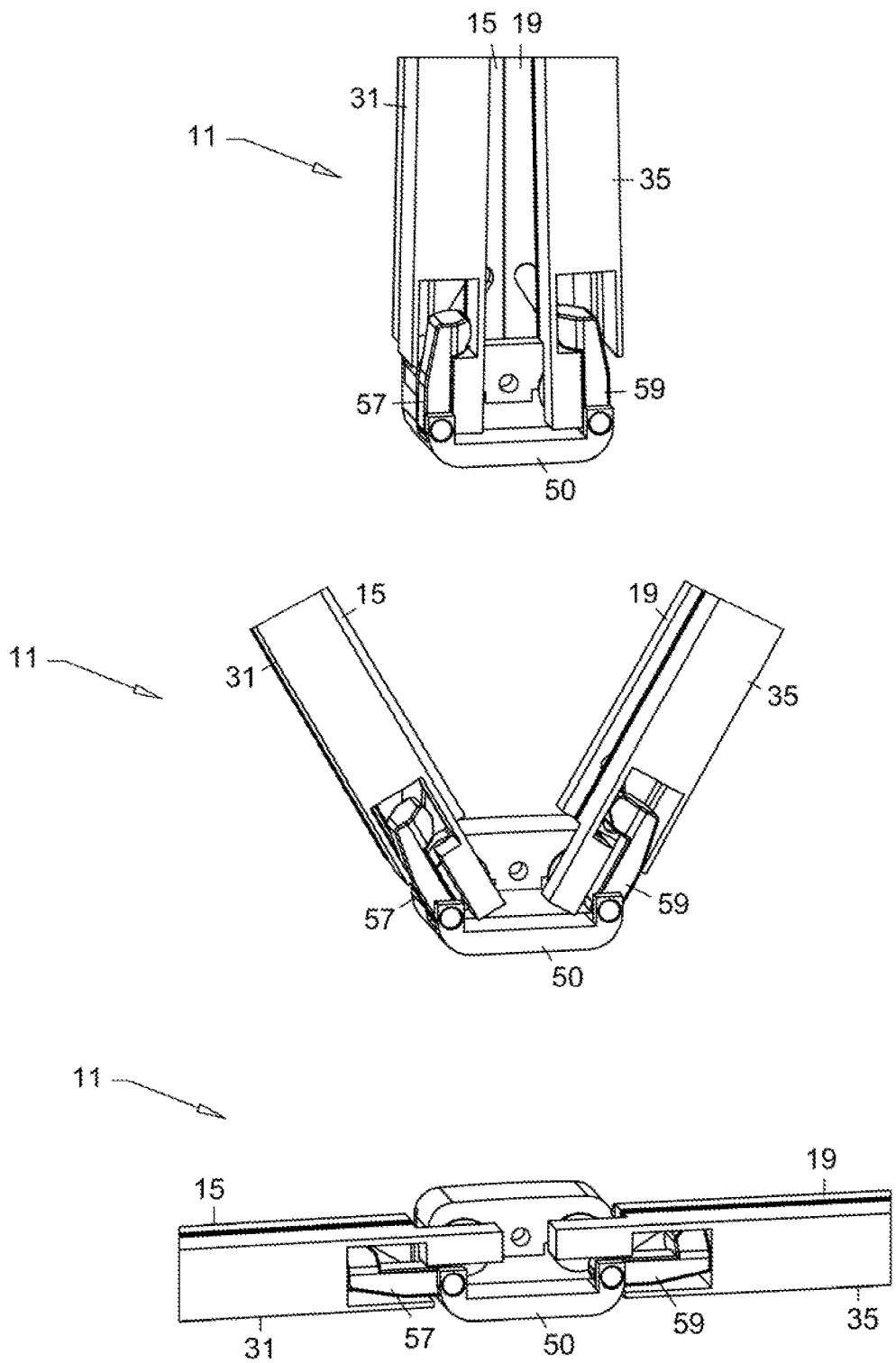
FIG. 2 is a perspective view of a folding sequence for the foldable computing device shown in FIG. 1 where the peripheral enclosure panels and its drive mechanism are shown automatically retracting into channels along the device's edges in conjunction with the device's hinge as the device transitions from a folded state to an unfolded state.

FIG. 2 shows a motion sequence diagram of the same components shown in FIG. 1, but in full assembly to illustrate how the mechanism can drive peripheral enclosure panels 15 and 19 to retract and deploy from flexible display segment structures 35 and 31 as the device is unfolded and folded. The motion sequence is shown n three states, which includes a folded state at the top, a partially unfolded state in the middle, and a fully unfolded state at the bottom. As previously described for FIG. 1 a slot is included along the internal side of each of the peripheral enclosure panels 19 and 15, which engages with a pin situated at the top end of each of the panel drive links 59 and 57. As the device is folded, the pin at the top of each of the peripheral enclosure panels 19 and 15 forces each of the peripheral enclosure panels 19 and 15 to move inward and outward from segment structures 35 and 31. In this particular motion sequence, panel drive links 57 and 59 are shown forcing peripheral enclosure panels 15 and 19 to be deployed from segment structures 35 and 31 as the pins situated at the top of each of the panel drive links 57 and 59 move along the slots integrated with peripheral enclosure panels 15 and 19 as the device is configured to an unfolded state such that peripheral enclosure panels 15 and 19 are retracted and hidden within the edges of the device.

Figure 3:
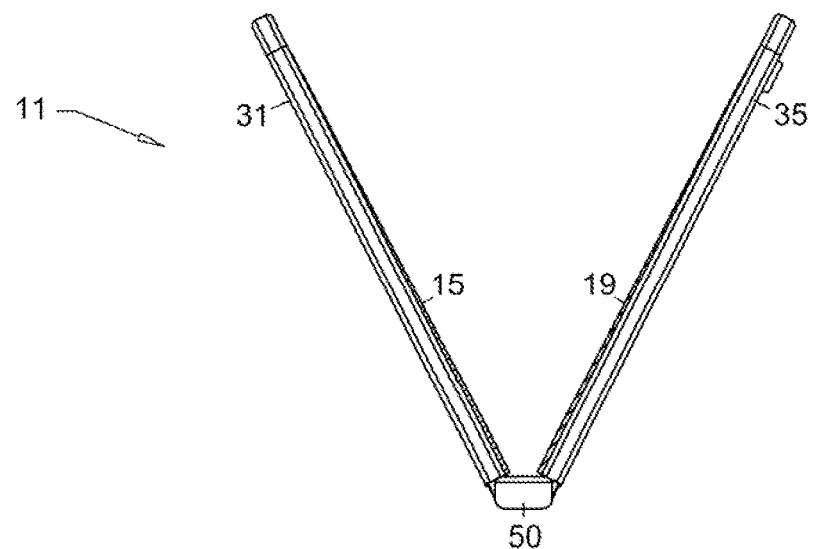
FIG. 3 is a side view of the folding sequence for the foldable computing shown FIG. 1 and FIG. 2 where the peripheral enclosure panels are shown rotating out of their respective channels along the device's edges to close the gap between flexible display segments as the device transitions from an unfolded state to a folded state.
Figure 3:
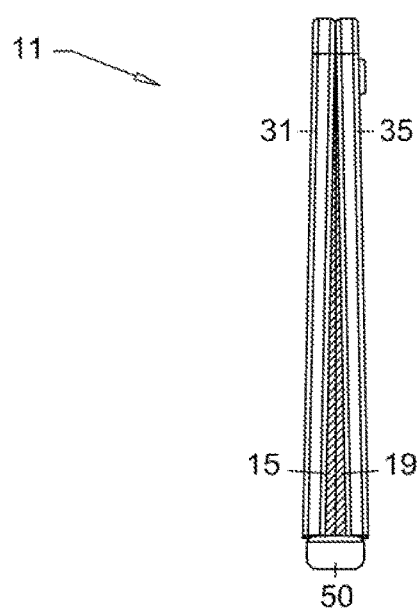

FIG. 3 shows the same motion sequence transition from FIG. 2, but from an unfolded state to a folded state where the side of the device is shown with peripheral enclosure panels 15 and 19 being deployed inward towards the center of the gap which is situated between flexible display segment structures 30 and 35 such that dirt and debris cannot enter into the sides of the device when it is positioned in a folded state. It should be noted that while this embodiment shows peripheral enclosure panels 15 and 19 that are automatically adjusted into positions the device folds and unfolds, these same peripheral enclosure panels 15 and 19 could also be manually moved into a deployed state to close the gap between flexible display segment structures 30 and 35 when the device is in a folded position, and then manually moved to a retracted position with flexible display segment structures 30 and 35 when the device is an unfolded state such that they are protruding from the edge of the device.

What is claimed is:

1. An apparatus comprising:
    (a) a flexible touch-sensitive display comprising a first flexible touch-sensitive display portion and a second flexible touch-sensitive display portion; wherein:
        (1) the first flexible touch-sensitive display portion is attached to a first structural support segment;
        (2) the second flexible touch-sensitive display portion is attached tee a second structural support segment;
        (3) the flexible touch-sensitive display further comprises having a fully folded state;
        (4) the flexible touch-sensitive display further comprises having a partially expanded state; and
        (5) the flexible touch-sensitive display further comprises having a fully expanded state; and
    (b) a peripheral enclosure panel integrated with at least one structural support segment such that the peripheral enclosure panel can be moved to provide a seal along the edge of the apparatus when the apparatus is configured in a fully folded state, wherein
        the peripheral enclosure panel includes a slot; and
        the apparatus includes a pin such that as the user of the apparatus forces the peripheral enclosure panel to move the peripheral enclosure panel is guided along the geometry of the slot as the slot slides against the pin.

2. The apparatus of claim 1 wherein:
    the pin engages with a hole along the edge of at least one structural segment support such that it can rotate about the pin.

3. The apparatus of claim 1 wherein:
the peripheral enclosure panel includes a hole that engages with the pin along the edge of at least one structural segment support such that it can rotate about the pin.

4. The apparatus of claim 1 wherein:
the peripheral enclosure panel includes a first peripheral enclosure panel integrated with the first structural support segment, and a second peripheral enclosure panel integrated with the second structural support segment such that both peripheral enclosure panels can move to provide a seal along the same edge of the apparatus when the apparatus is in a folded state.

5. The apparatus of claim 1, wherein:
the fully folded state comprises a fully folded angle between the first flexible touch-sensitive display portion and the second flexible touch-sensitive display portion that is less than degrees; and
the hilly expanded state comprises a fully expanded angle between the first flexible touch-sensitive display portion and the second flexible touch-sensitive display portion that is between 170 and 190 degrees; and
the partially expanded state comprises an angle that falls between the fully folded state and the fully expanded state.

6. The apparatus of claim 1 wherein:
the peripheral enclosure panel is configured to move manually as the apparatus is folded or unfolded.

7. An apparatus comprising:
(a) a flexible touch-sensitive display comprising a first flexible touch-sensitive display portion and a second flexible touch-sensitive display portion; wherein:
  (1) the first flexible touch-sensitive display portion is attached to a first structural support segment;
  (2) the second flexible touch-sensitive display portion is attached to a second structural support segment;
  (3) the flexible touch-sensitive display further comprises having a fully folded state;
  (4) the flexible touch-sensitive display further comprises having a partially expanded state; and
  (5) the flexible touch-sensitive display further comprises having a fully expanded state; and
(b) a peripheral enclosure panel integrated with at least one structural support segment such that the peripheral enclosure panel can be moved to provide a seal along the edge of the apparatus when the apparatus is configured in a fully folded state, wherein
the peripheral enclosure panel includes a pin; and
the apparatus includes a slot such that as the user of the apparatus forces the peripheral enclosure panel to move the peripheral enclosure panel is guided along the geometry of the slot as the pin slides against the slot.

8. The apparatus of claim 7 wherein:
the pin engages with a hole along the edge of at least one structural segment support such that it can rotate about the pin.

9. The apparatus of claim 7 wherein:
the peripheral enclosure panel includes a hole that engages with the pin along the edge of at least one structural segment support such that it can rotate about the pin.

10. The apparatus of claim 7 wherein:
the peripheral enclosure panel includes a first peripheral enclosure panel is integrated with the first structural support segment, and a second peripheral enclosure panel is integrated with the second structural support segment such that both peripheral enclosure panels can move to provide a seal along the same edge of the apparatus when the apparatus is in a folded state.

11. The apparatus of claim 7 wherein:
the fully folded state comprises a fully folded angle between the first flexible touch-sensitive display portion and the second flexible touch-sensitive display portion that is less than degrees; and
the fully expanded state comprises a fully expanded angle between the first flexible touch-sensitive display portion and the second flexible touch-sensitive display portion that is between 170 and 190 degrees; and
the partially expanded state comprises an angle that falls between the fully folded state and the hilly expanded state.

12. The apparatus of claim 7 wherein:
the peripheral enclosure panel is configured to move manually as the apparatus is folded or unfolded.

* * * * *